April 18, 1967 A. P. WOLFF 3,314,211
METHOD OF PACKAGING TACKY ELASTOMERIC MATERIAL AND
PACKAGING PAPER THEREFOR
Filed Oct. 29, 1964
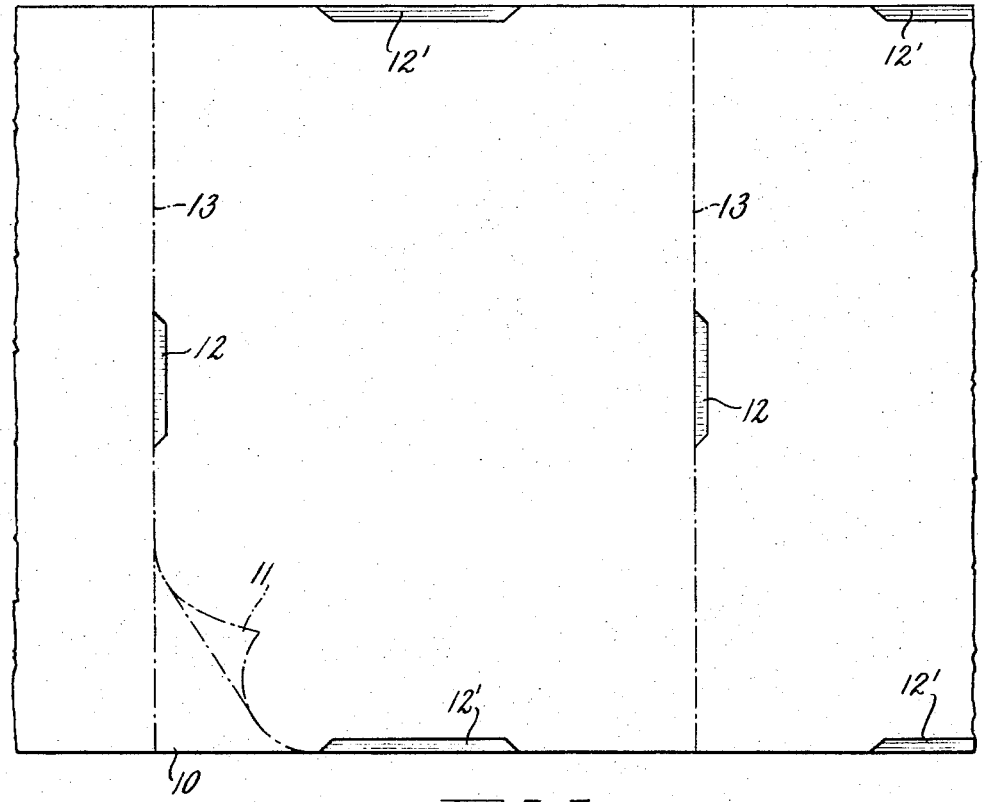
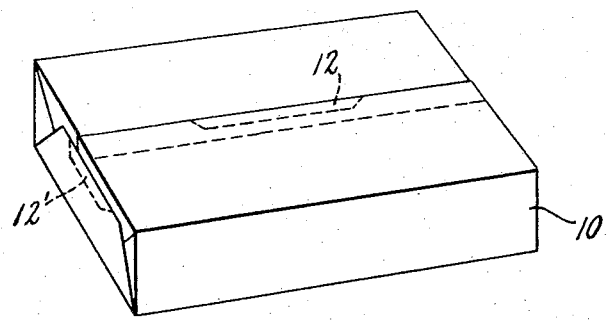
INVENTOR.
ANTHONY P. WOLFF
BY
ATTORNEY 3,314,211
METHOD OF PACKAGING TACKY ELASTOMERIC MATERIAL AND PACKAGING PAPER THEREFOR
Anthony P. Wolff, Baton Rouge, La., assignor to United States Rubber Company, New York, N.Y., a corporation of New Jersey
Filed Oct. 29, 1964, Ser. No. 407,421
4 Claims. (Cl. 53—32)

This invention relates to methods of packaging tacky elastomeric materials, for example, rubber bales and rubber slabs, and to package paper therefor.

To package tacky materials, it has heretofore been the practice to utilize loosely filled, multi-ply paper bags which have sewn closures and which are coated internally with release materials such as oils, clay talc or silicone resin to prevent adherence of the tacky material to the paper walls. Multiple wrappings within corrugated cardboard boxes have also been used. Such packaging methods are more costly and wasteful of materials than is desirable.

It is an object of the present invention, therefore, to provide a new and improved, simple and economical method of packaging tacky elastomeric material.

In accordance with the invention, a method of packaging tacky elastomeric material comprises supplying packaging paper having a release-coating pattern on a surface thereof for contact with the elastomeric material and having a pattern of paper regions free of release coating contiguous with the release coating pattern. The method also comprises the step of tightly wrapping the elastomeric material with the release-coated surface in contact with the elastomeric material and with adhesive applied to regions free of the release coating to seal the package.

Also in accordance with the invention, paper for packaging tacky elastomeric material comprises a continuous sheet of paper having a release-coating pattern on a surface thereof for contact with the elastomeric material and having, contiguous with the release-coating pattern, a repetitive pattern of paper regions free of release coating for the application of an adhesive thereto.

For a better understanding of the present invention, together with other and further objects thereof, reference is made to the following description, taken in connection with the accompanying drawings, and its scope will be pointed out in the appended claims.

Referring now to the drawings:

FIG. 1 is a plan view of packaging paper in accordance with the present invention; and FIG. 2 is a perspective view of a wrapped bale of rubber utilizing a portion of the FIG. 1 sheet.

Referring now more particularly to FIG. 1 of the drawing, there is represented a continuous sheet of packaging paper which may be supplied from a roll and which preferably has two plies, an outer ply 10 and an inner ply 11 having a release coating pattern on a surface thereof for contact with the elastomeric material and having a repetitive pattern of regions 12 for the overlapping margin center seam of the package and regions 12' for the two end flap seams of the package, of such regions being free of the release coating for application of an adhesive thereto. The regions 12 and 12' preferably are regions of the outer ply 10 exposed through the inner ply 11. These regions can be formed by die cutting the inner ply during the subsequent wrapping operation or by die cutting prior to use in an overwrap machine. Each ply may, for example, be 60 pound natural kraft paper.

The inner ply 11 preferably is silicone resin coated with a silicone resin of 50 Keil release factor or less.

The pattern of the silicone release can also be printed on a single ply sheet of paper if desired, to provide uncoated regions 12 and 12' suitable for application of an adhesive.

When a roll of paper is supplied with the silicone release pattern on the continuous sheet, the paper is cut along lines intersecting regions 12 of the release pattern as indicated by broken lines 13 of FIG. 1.

The method of the invention comprises tightly wrapping the elastomeric material with the release-coated surfaces in contact with the elastomeric material and with a suitable adhesive applied to the aforesaid regions of the pattern free of the release coating to seal the package, as represented in FIG. 2. The adhesive may be applied to the outer ply at any convenient stage of manufacture or wrapping.

The method of the present invention results in a tightly wrapped rectangular shaped package which may have unit loads of, for example, 2500 lbs. suitable for stacking.

While there has been described what is at present believed to be the preferred embodiment of the invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A method of packaging tacky elastomeric materials comprising supplying packaging paper having a release coating pattern on a surface thereof for contact with the elastomeric material and having a pattern of paper regions free of release coating contiguous with the release coating pattern, and tightly wrapping the elastomeric material with the release-coated surface in contact with the elastomeric material and with adhesive applied to regions free of the release coating to seal the package.

2. A method of packaging tacky elastomeric material comprising supplying a multi-ply packaging paper having a release-coating pattern on a surface of a first ply for contact with the elastomeric material and having a repetitive pattern of paper regions of a second ply free of release coating and exposed through the release-coated surface of the first ply, cutting the paper along lines intersecting the release-coated surface and the regions free of the release coating, and tightly wrapping the elastomeric material with the release-coated surface in contact with the elastomeric material and with adhesive applied to the regions free of the release coating to seal the package.

3. Paper for packaging tacky elastomeric material comprising a continuous sheet of paper having a release-coating pattern on a surface thereof for contact with the elastomeric material and having, contiguous with said release-coating pattern, a repetitive pattern of paper regions free of release coating for the application of an adhesive thereto.

4. Paper for packaging tacky elastomeric material comprising a continuous sheet of multi-ply paper having a release-coating pattern on substantially the entire surface of a first ply for contact with the elastomeric material and having, contiguous with said release-coating pattern, a repetitive pattern of paper regions of a second ply free of release coating exposed through said first ply for the application of an adhesive to said regions free of release coating.

No references cited.

GRANVILLE Y. CUSTER, JR., *Primary Examiner.*